United States Patent
Lee et al.

(10) Patent No.: US 7,596,557 B2
(45) Date of Patent: Sep. 29, 2009

(54) SYSTEM AND METHOD FOR FILTERING XML FILES

(75) Inventors: Chung-I Lee, Taipei Hsien (TW);
Chien-Fa Yeh, Taipei Hsien (TW);
Chiu-Hua Lu, Taipei Hsien (TW);
Xu-Chun Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 137 days.

(21) Appl. No.: 11/770,756

(22) Filed: Jun. 29, 2007

(65) Prior Publication Data
US 2008/0154881 A1    Jun. 26, 2008

(30) Foreign Application Priority Data
Dec. 20, 2006   (CN) .......................... 2006 1 0157713

(51) Int. Cl.
G06F 17/30   (2006.01)
(52) U.S. Cl. .......................................... 707/4; 707/102
(58) Field of Classification Search .................. 707/1–6
See application file for complete search history.

(56) References Cited

U.S. PATENT DOCUMENTS

| 7,013,289 | B2 * | 3/2006 | Horn et al. .................... 705/26 |
| 2005/0114316 | A1 | 5/2005 | Fontoura et al. | |
| 2007/0245409 | A1 * | 10/2007 | Harris et al. ................... 726/5 |
| 2008/0027782 | A1 * | 1/2008 | Freire et al. .................... 705/9 |

* cited by examiner

*Primary Examiner*—Diane Mizrahi
(74) *Attorney, Agent, or Firm*—Frank R. Niranjan

(57) ABSTRACT

A computer-based method for filtering XML files is disclosed. The method includes: configuring XQuery scripts of each of the tasks and a scheduled time to perform each of the tasks, and storing the XQuery scripts in a database; scheduling the tasks in a scheduling server; sending a task request by the scheduling server to a processing server when it is time to perform the task; invoking the XQuery scripts of each of the tasks from the database when the processing server receives the task request; processing each of the XML files, and obtaining a XQuery result; merging the XQuery result of the XQuery scripts of each of the tasks, and storing a merged result of each of the tasks in the database. A related system is also disclosed.

8 Claims, 3 Drawing Sheets

SYSTEM AND METHOD FOR FILTERING XML FILES

BACKGROUND OF THE INVENTION

1. Field of the Invention

The present invention is related to a system and method for filtering XML files.

2. Description of Related Art

Extensible markup language (XML) is a standard for structuring information, the XML enables information to be easily distributed. XML files consist of nested elements, and each of the elements may contain content. The element or nested elements contains a start tag, a close tag and content in between them.

Given the widespread use of XML in both private and business environments, there is a growing need or desire for the ability to query the XML data quickly and accurately. XQuery is a query language that is designed to process data from XML files or any data source that can be viewed as XML/HTML . . . etc. Facing large numbers of query tasks (a query task is regarded as a task request), there is a need to process the task requests simultaneously.

Therefore, what is needed is a system and method for filtering XML files which can filter one or more XML files simultaneously.

SUMMARY OF THE INVENTION

A system for filtering XML files is provided in accordance with a preferred embodiment. The system includes a task control computer, a scheduling server, a processing server and a database. The database stores XQuery scripts of each of the tasks. The task control computer includes a task setting module and a scheduling module. The scheduling server includes a sending module. The processing server includes a script invoking module, a file filtering module and a merging module. The task setting module is configured for configuring the XQuery scripts of each of the tasks and a scheduled time to perform each of the tasks, and storing the XQuery scripts in the database. The scheduling module is configured for scheduling the tasks in the scheduling server. The sending module is configured for sending a task request to the processing server when it is time to perform the task. The script invoking module is configured for invoking the XQuery scripts of each of the tasks from the database when the task request is received. The file filtering module is configured for processing each of the XML files, and obtaining an XQuery result. The merging module is configured for merging the XQuery result of the XQuery scripts of each of the tasks, and storing a merged result of each of the tasks in the database.

A computer-based method for filtering XML files is also provided. The method includes the steps of: configuring XQuery scripts of each of the tasks and a scheduled time to perform each of the tasks, and storing the XQuery scripts in a database; scheduling the tasks in a scheduling server; sending a task request by the scheduling server to a processing server when it is time to perform the task; invoking the XQuery scripts of each of the tasks from the database when the processing server receives the task request; processing each of the XML files, and obtaining an XQuery result; merging the XQuery result of the XQuery scripts of each of the tasks, and storing a merged result of each of the tasks in the database.

Other systems, methods, features, and advantages of the present invention will be or become apparent to one with skill in the art upon examination of the following drawings and detailed description.

DETAILED DESCRIPTION OF THE INVENTION

Figure 1:
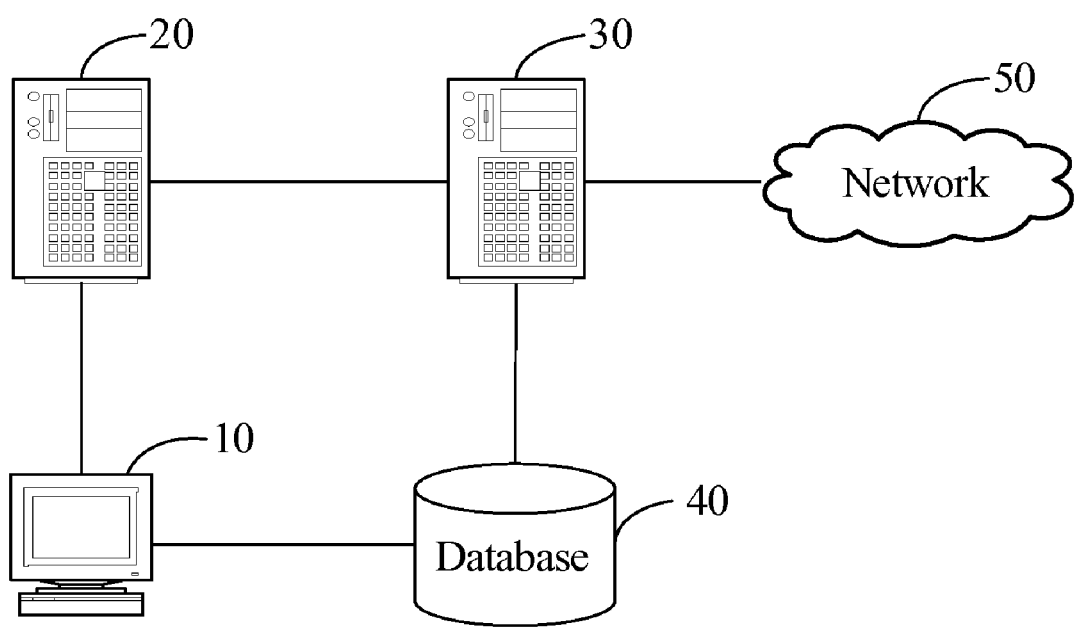
FIG. 1 is a schematic diagram of hardware configuration of a system for filtering XML files in accordance with a preferred embodiment.

FIG. 1 is a schematic diagram of hardware configuration of a system for filtering XML files (hereinafter, "the system") in accordance with a preferred embodiment. The system typically includes a task control computer 10, a scheduling server 20, a processing server 30, and a database 40. The processing server 30 connects to a network 50 so that large numbers of XML files (i.e., XML-formatted web pages) can be retrieved. The task control computer 10 and the processing server 30 both connect to the database 40. The database 40 is configured for storing XQuery scripts of each of the tasks and element contents of the XML files. An element contains a start tag, an end tag, and contents in between them. For example, the element "<title> this web page </title>" has the start tag "<title>", the end tag "</title>", and the element contents "this web page" between the start tag and the end tag. For simplicity purposes, an element name is derived from the start tag, such "title" or "<title>" as used in the example above. Each of the XQuery scripts may contain the element names of the elements in the XML files that need to be processed (retrieved). Each of the XML files may include one or more elements. In the preferred embodiment, each of the tasks filters the elements in one or more XML files. When the processing server 30 filters the XML files, only the elements with the element name included in the XQuery scripts are processed.

The task control computer 10 connects to the scheduling server 20, and is configured for configuring the XQuery scripts of each of the tasks (i.e., configuring which element names of the elements in the XML files need to be processed), configuring a scheduled time to perform each of the tasks, storing the XQuery scripts in the database 40, and scheduling the tasks in the scheduling server 20. The scheduled time of the task is the time when the task is performed. Each of the tasks may include one or more XML files to be filtered. If the scheduled time of one or more of the tasks is the same, the processing server 30 filters the XML files of the one or more of the tasks simultaneously. Otherwise, the processing server 30 processes the tasks sequentially according to the scheduled time. The scheduling server 20 is configured for sending a task request to the processing server 30 when it is time to perform the task.

The processing server 30 also connects to the scheduling server 20, and is configured for invoking the XQuery scripts of each of the tasks from the database 40 when the task request is received, filtering each of the XML files (i.e., retrieving the contents of the elements from each of the XML files in the network 50 according to the element names included in the XQuery script), obtaining an XQuery result (i.e., the contents of the elements), merging the XQuery result of the XQuery scripts of each of the tasks, and storing a merged result of each of the tasks in the database 40.

Figure 2:
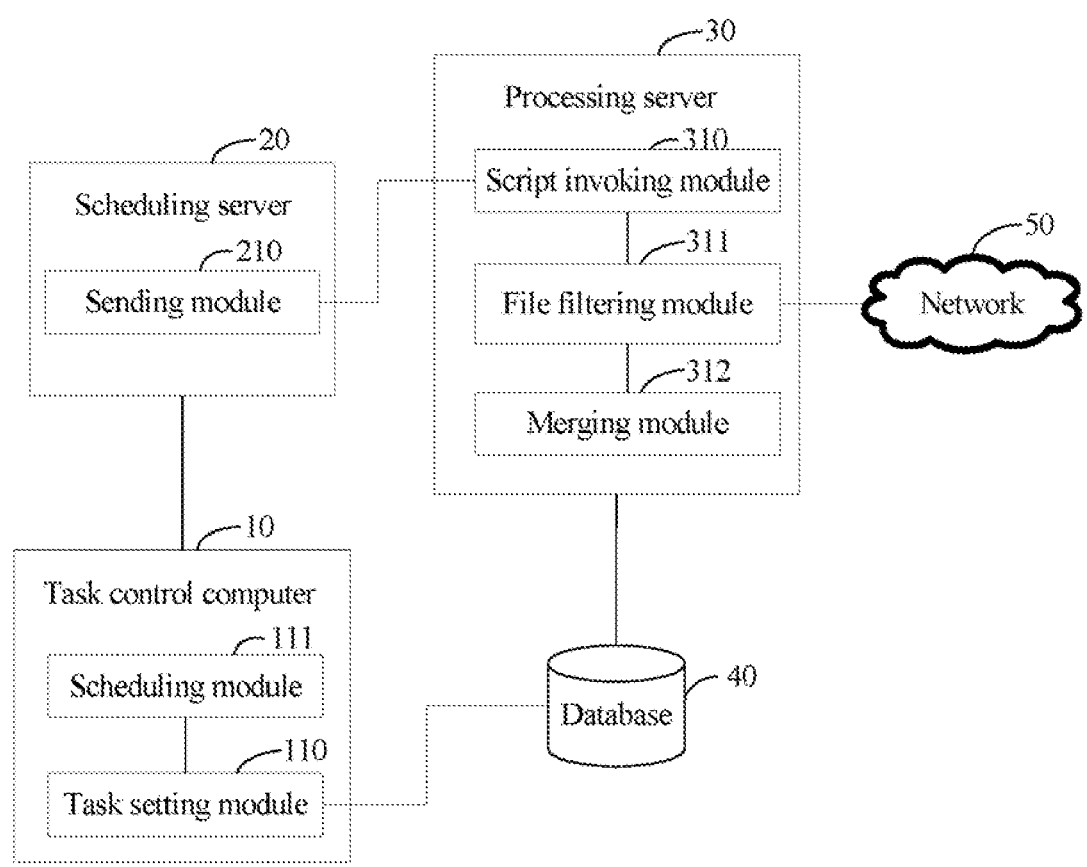
FIG. 2 is a schematic diagram showing function modules of the system of FIG. 1.

FIG. 2 is a schematic diagram showing function modules of the system of FIG. 1. The task control computer 10 may include a task setting module 110 and a scheduling module 111. The scheduling server 20 may include a sending module

210. The processing server 30 may include a script invoking module 310, a file filtering module 311, and a merging module 312.

The task setting module 110 is configured for configuring the XQuery scripts of each of the tasks and a scheduled time to perform each of the tasks, and further for storing the XQuery scripts in the database 40. Each of the tasks may include one or more XQuery scripts. Each of the XQuery scripts may contain the element names of the elements in the XML files that need to be processed (retrieved), and each of the XML files may include one or more elements. The scheduling module 111 is configured for scheduling the tasks in the scheduling server 20.

The sending module 210 is configured for sending the task request to the processing server 30 when it is time to perform the task. The script invoking module 310 is configured for invoking the XQuery scripts of each of the tasks from the database 40 when the task request is received.

The file filtering module 311 is configured for filtering each of the XML files (i.e., retrieving the contents of the elements from each of the XML files in the network 50 according to the element names included in the XQuery script), and obtaining the XQuery result (i.e., the contents of the elements).

The merging module 312 is configured for merging the XQuery result of the XQuery scripts of each of the tasks, and storing the merged result of each of the tasks in the database 40. For example, a task A includes two XQuery scripts: a1.xq and a2.xq; and a task B also includes two XQuery scripts: b1.xq and b2.xq. When the XQuery scripts of a1.xq, a2.xq, b1.xq, and b2.xq are invoked by the file filtering module 311, the merging module 312 merges the XQuery result of each of the XQuery scripts of a1.xq and a2.xq to obtain the merged result of the task A, and merges the XQuery result of each of the XQuery scripts of b1.xq and b2.xq to obtain the merged result of the task B. Then, the merging module 312 stores the merged results of the task A and the merged results of the task B in the database 40.

The file filtering module 311 also determines whether the network 50 is disconnected when filtering the XML files. If the network 50 is disconnected, the file filtering module 311 re-filters the XML files.

Figure 3:
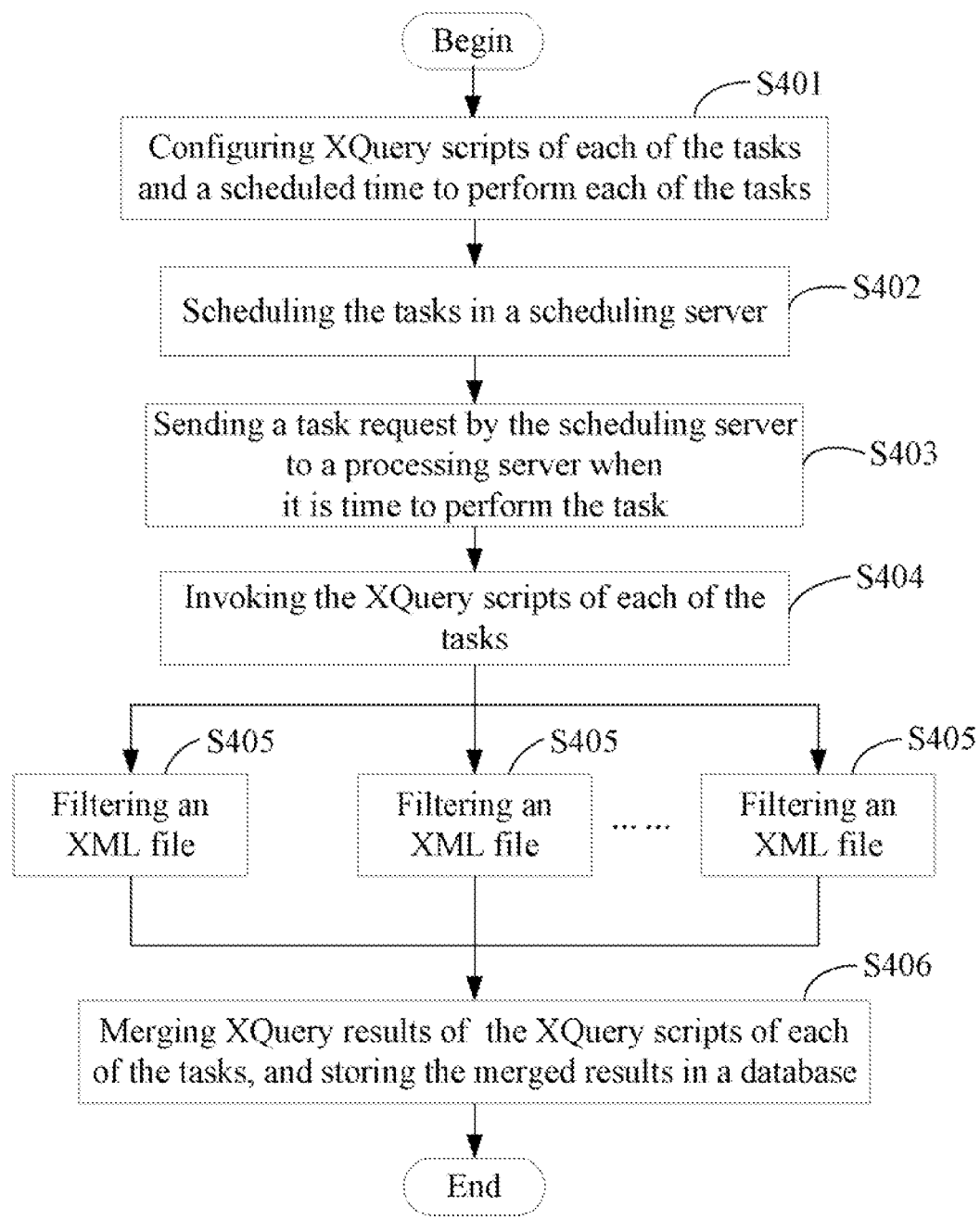
FIG. 3 is a flowchart of a preferred method for filtering XML files in accordance with one embodiment.

FIG. 3 is a flowchart of a preferred method for filtering XML files in accordance with one embodiment. In step S401, the task setting module 110 configures the XQuery scripts of each of the tasks and the scheduled time to perform each of the tasks, and stores the XQuery scripts in the database 40. Each of the tasks may include one or more XQuery scripts. Each of the XQuery scripts may contain the element names of the elements in the XML files that need to be processed (retrieved), and each of the XML files may include one or more elements.

In step S402, the scheduling module 111 schedules the tasks in the scheduling server 20.

In step S403, the sending module 210 sends the task request to the processing server 30 when it is time to perform the task.

In step S404, when the processing server 30 receives the task request, the script invoking module 310 invokes the XQuery scripts of each of the tasks from the database 40.

In step S405, the file filtering module 311 filters each of the XML files (i.e., retrieving the contents of the elements from each of the XML files in the network 50 according to the element names included in the XQuery script), and obtains the XQuery result (i.e., the contents of the elements).

In step S406, the merging module 312 merges the XQuery result of each of the XQuery scripts of each of the tasks, and stores the merged result of each of the tasks in the database 40.

The file filtering module 311 determines whether the network 50 is disconnected when filtering the XML files. If the network 50 is disconnected, the file filtering module 311 re-filters the XML files.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for filtering XML files, the system comprising a task control computer, a scheduling server, a processing server, and a database, the database storing XQuery scripts of each of the tasks, the task control computer comprising:
   a task setting module configuring the XQuery scripts of each of the tasks and a scheduled time to perform each of the tasks, and storing the XQuery scripts in the database, each of the XQuery scripts contains names of elements in the XML files that need to be retrieved; and
   a scheduling module scheduling the tasks in the scheduling server;
   the scheduling server comprising:
   a sending module sending a task request to the processing server when the scheduled time is reached; and
   the processing server comprising:
   a script invoking module invoking the XQuery scripts of each of the tasks from the database when the task request is received;
   a file filtering module filtering each of the XML files, and obtaining an XQuery result; and
   a merging module merging the XQuery result of the XQuery scripts of each of the tasks, and storing a merged result of each of the tasks in the database.

2. The system according to claim 1, wherein the scheduled time of each of the tasks is the same.

3. A computer-based method for filtering XML files, the method comprising the steps of:
   configuring XQuery scripts of each of the tasks and a scheduled time to perform each of the tasks, and storing the XQuery scripts in a database, each of the XQuery scripts contains names of elements in the XML files that need to be retrieved;
   scheduling the tasks in a scheduling server;
   sending a task request by the scheduling server to a processing server when the scheduled time is reached;
   invoking the XQuery scripts of each of the tasks from the database when the processing server receives the task request;
   filtering each of the XML files, and obtaining an XQuery result;

merging the XQuery result of the XQuery scripts of each of the tasks, and storing a merged result of each of the tasks in the database; and at least one processor for executing the aforementioned steps.

4. The method according to claim 3, wherein each of the tasks has the same scheduled time.

5. The method according to claim 3, wherein each of the tasks refers to filtering the elements in one or more XML files, and each element contains a start tag, an end tag, and contents between the start tag and the end tag.

6. The method according to claim 5, wherein the step of filtering each of the XML files refers to: retrieving the contents of the elements from each of the XML files in the network according to the element names included in the XQuery script.

7. The method according to claim 5, wherein the XQuery result refers to the contents of the elements.

8. The method according to claim 3, further comprising: re-filtering the XML files if the network is disconnected.

* * * * *